(No Model.)
C. L. DANFORTH.
NUT LOCK.
No. 543,958. Patented Aug. 6, 1895.
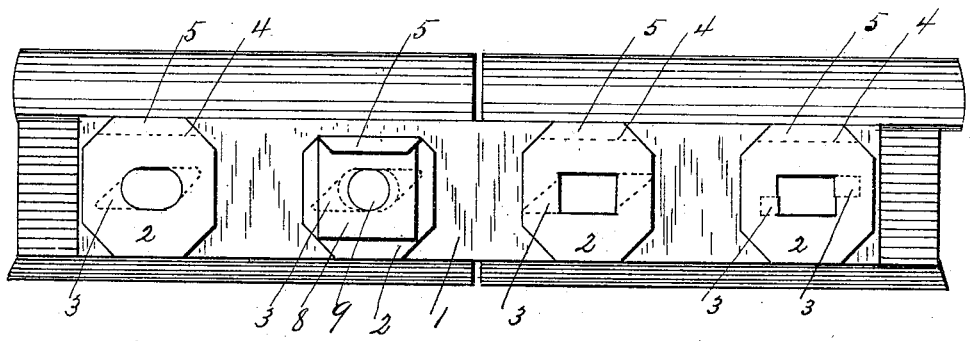
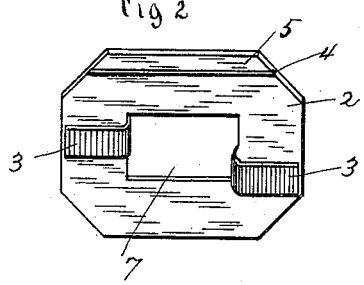
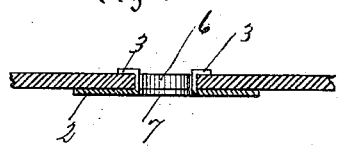
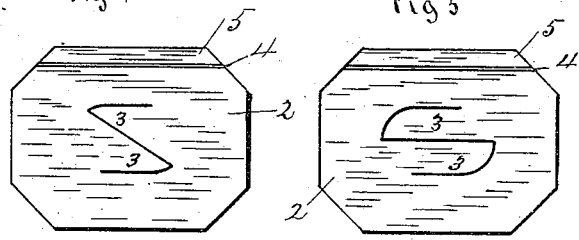
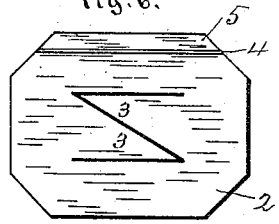
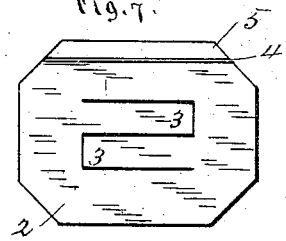
Witnesses
Inventor.
Cyrus L. Danforth
By N. B. Hagin, Atty

UNITED STATES PATENT OFFICE.

CYRUS L. DANFORTH, OF LEAVENWORTH, KANSAS, ASSIGNOR TO WILLIAM B. McMASTER AND FRANK W. WEISE, OF SAME PLACE.

NUT-LOCK.

SPECIFICATION forming part of Letters Patent No. 543,958, dated August 6, 1895.

Application filed November 27, 1894. Serial No. 530,119. (No model.)

*To all whom it may concern:*

Be it known that I, CYRUS L. DANFORTH, a citizen of the United States of America, residing at Leavenworth, in the county of Leavenworth and State of Kansas, have invented certain new and useful Improvements in Nut-Locks, of which the following is a specification, reference being had therein to the accompanying drawings, and the figures of reference thereon, forming a part of this specification, in which—

Figure 1 is a side view of a section of a railroad-rail, showing my improved nut-lock attached to the fish-plate. Fig. 2 is a perspective view of the rear side of the nut-lock. Fig. 3 is a sectional view of the nut-lock and fish-plate; and Figs. 4, 5, 6, and 7 are plan views of the nut-lock, showing different ways of stamping out the opening for the bolt to pass through and leave the different-shaped ears for securing said nut-locks to the fish-plate.

This invention relates to certain improvements in nut-locks; and it consists in a washer with the center hole stamped in, leaving the material thus stamped out of said hole to form ears for securing the said washer to the fish-plate, and a groove on the rear side of said washer near the outer edge to make it more readily bend over on the side of the nut to hold the said nut from turning.

Referring to the drawings, 1 represents a fish-plate, to which is secured the nut-lock 2 by means of the ears 3.

4 is a groove in the rear side of the nut-lock near the outer edge.

5 is a portion of the nut-lock adapted to be bent over on the nut 8 for holding said nut from turning. The ears 3 of the nut-lock 2 are stamped out, as shown in Figs. 4, 5, 6, and 7, leaving the center hole 7 to correspond with the hole 6 in the fish-plate. The said ears are bent through said hole 6 and against the rear side of said fish-plate (see Fig. 3) for the purpose of securing said nut-lock to said fish-plate. After the nut 8 is turned on the bolt 9, tight against the nut-lock 2, the portion 5 of said nut-lock 2 is bent down on the said nut, thus preventing it from turning. The lower edge of said nut-lock is adapted to rest against the lower flange of the rail, as shown in Fig. 1.

Having thus described my invention, what I desire to secure by Letters Patent is as follows:

In the herein described nut lock, the combination of a fish plate, the nut lock consisting of a washer having the center stamped out to form the ears 3 which pass through the holes 6 in said fish plate said ears 3 pressing snug against the rear side of said fish plate, and the groove 4 near the outer edge of said washer to permit the portion 5 to be bent over, substantially as shown and described.

CYRUS L. DANFORTH.

Witnesses:
SAMUEL CUNNINGHAM,
THOMAS P. RUDY.